United States Patent [19]

Ichikawa et al.

[11] 4,089,487
[45] May 16, 1978

[54] APPARATUS FOR TAPE RECORDER

[75] Inventors: Hiroki Ichikawa; Masao Kobayashi, both of Hachioji, Japan

[73] Assignee: Olympus Optical Co., Ltd., Tokyo, Japan

[21] Appl. No.: 723,593

[22] Filed: Sep. 15, 1976

[30] Foreign Application Priority Data

Mar. 22, 1976  Japan ................................. 51-34218

[51] Int. Cl.² ....................... G11B 15/02; G11B 15/30
[52] U.S. Cl. ..................................... 242/186; 242/57; 242/189; 242/201; 360/74
[58] Field of Search ............... 242/189, 190, 191, 186, 242/57, 201, 202, 208, 209, 210; 360/74; 116/67 A, 114 J

[56] References Cited

U.S. PATENT DOCUMENTS 3,572,606  3/1971  Yamamoto ........................ 242/57 X
3,946,436  3/1976  Takashino ............................ 242/191

Primary Examiner—George F. Mautz
Attorney, Agent, or Firm—Ostrolenk, Faber, Gerb & Soffen

[57] ABSTRACT

An apparatus for use with a tape recorder having a support member which supports a tape supply shaft and providing an indication of a tape end through its displacement which occurs in response to an increase in the tape tension as the tape reaches its terminal end, and also having a review/rewind actuating member which may be operated to change the direction of tape feed to run the tape in a rewind direction. The apparatus comprises a detent member which is operated as the review/rewind actuating member is operated to move into the path of movement of the support member to prevent its displacement, thereby inhibiting the detection of a tape end during a review or rewind operation.

2 Claims, 4 Drawing Figures

APPARATUS FOR TAPE RECORDER

BACKGROUND OF THE INVENTION

The invention relates to an apparatus for use with a tape recorder.

A tape recorder is known which includes a displaceable support member on which a tape supply shaft is rotatably mounted and which maintains the shaft in its normal tape feeding position while a sufficient length of tape remains thereon, but which undergoes a displacement in response to an increase in the tape tension as a terminal end of the tape is reached, the displacement of the support member being effective to produce a warning that there is no available length of the tape.

One of the problems encountered with such a tape recorder is the embarrassing effect which the displaceable support member presents during a review/rewind operation. Specifically, when the review/rewind actuating member is operated, the drive unit is disengaged from a drive wheel associated with a tape take-up shaft, and is engaged with a drive wheel associated with the tape supply shaft. This frequently accompanies a displacement of the tape supply shaft as well as the support member thereof much in the same manner as they move when the tape reaches its terminal end, thus producing a tape end warning signal when it is unnecessary, which is embarrassing.

SUMMARY OF THE INVENTION

It is an object of the invention to provide an apparatus for use with a tape recorder which eliminated the above inconvenience by inhibiting a wrong time detection of a tape end during a review or rewind operation.

In accordance with the invention, there is provided a detent member which is operated as the review/rewind actuating member is operated, to prevent a movement of the support member for the tape shaft during a review or rewind operation. Because of this arrangement, no displacement of the support member occurs if it or the tape supply shaft is urged when a review or rewind mode is entered, precluding the tape end warning signal from being generated.

DESCRIPTION OF PREFERRED EMBODIMENT

Figure 1:
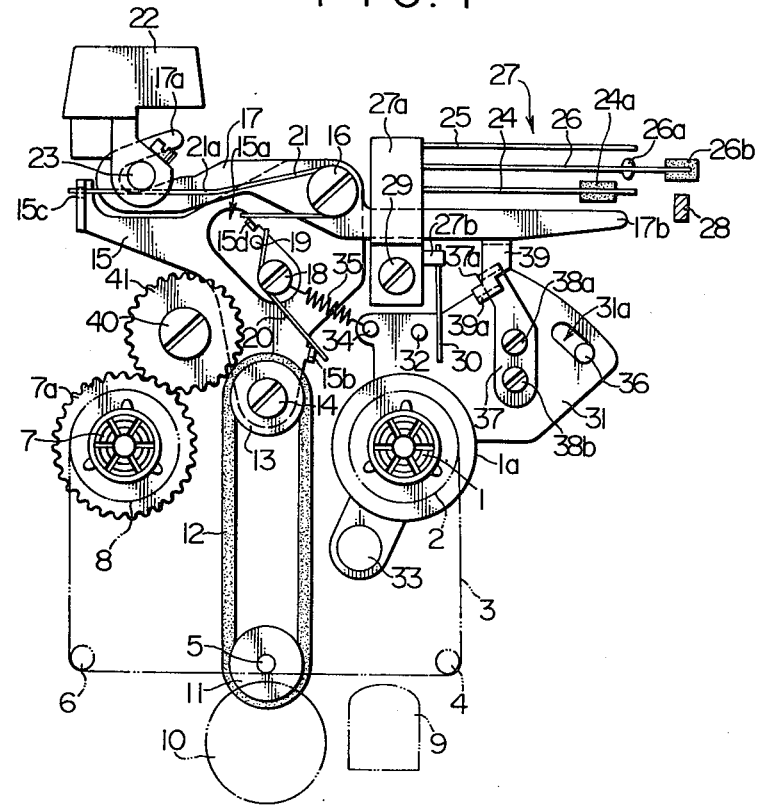
FIG. 1 is a plan view of one embodiment of the invention.

Referring to FIG. 1, an apparatus according to the invention as incorporated into a tape recorder is shown in its inoperative condition. The tape recorder shown includes a tape supply shaft on which a tape hub 2 is fitted. A length of magnetic tape 3 extends from the tape hub 2 around a guide pin 4, a capstan 5, and a guide pin 6 and is wound on another tape hub 8 which fits on a tape take-up shaft 7, as indicated by phantom lines. A magnetic head 9 is shown in phantom lines as disposed along the tape span extending across the guide pins 4, 6. A pinch roller 10 is located opposite to the capstan 5 on the opposite side of the magnetic tape 3. In the inoperative condition shown in FIG. 1, both the head 9 and the pinch roller 10 are removed from the magnetic tape 3.

The capstan 5 is integrally formed with a concentric pulley 11, and is connected with a suitable drive source, not shown, through conventional means. The pulley 11 is engaged by a belt 12, which also extends around another pulley 13 which is rotatably mounted on a stud 14 which is secured to the lower end of a cue, review and rewind actuating member 15. The actuating member 15 is rotatably mounted on a support shaft 16, on which a switch operating member 17 is also rotatably mounted.

The cue, review and rewind actuating member 15 is centrally formed with an elongate slot 15a therein in which a stationary shaft 18 and a stationary pin 19 are disposed, these shaft and pin being fixedly mounted on a stationary part, not shown. A torsion spring 20 is disposed on the stationary shaft 18 and has its one end bearing against the stationary pin 19 and its other end engaged with a projection 15b which is upturned from the right-hand edge of the lower arm of the actuating member 15, thus urging the member 15 to rotate clockwise about the shaft 16. A buffering torsion spring 21 is disposed on the shaft 16 and has its one end 21a engaged with a projection 15c, upturned from the end of the left-hand arm of the actuating member 15, and has its other end engaged with a projection 15d which is upturned from the right-hand edge of the slot 15a. A cue, review and rewind actuating button 22 has an integral pin 23 which is located in the vicinity of the limb 21a of the spring 21 and which is received in a recess 17a formed in the left-hand end of the switch operating member 17. The limb 21a of the spring 21 provides a buffering action in that it prevents the pin 23 from bumping against the actuating member 15. The other arm of the switch operating member 17 extends to the right, and forms a switch operating piece 17b which is located adjacent to an insulation pad 24a on an increased speed contact blade 24. The contact blade 24 forms a change-over switch 27 together with a normal speed contact blade 25 and a common contact blade 26. At their one end, these blades are supported in an insulating block 27a. The blade 26 is located intermediate the upper blade 25 and the lower blade 24. Adjacent to the other end, the common blade carries a conductive contact 26a thereon which assures its electrical contact with either blade 25, 24. The free end of the common blade 26 fixedly carries an insulating pad 26b which is located opposite to a pusher 28, which is adapted to be moved so as to achieve an electrical contact between the blade 25, 26 during a record/playback operation. In FIG. 1, the change-over switch 27 is shown in its off position.

The insulating block 27a of the change-over switch 27 is secured to a stationary part, not shown, as by set screw 29, and has a projection 27b extending from the right-hand side thereof on which a downwardly depending blade 30 is secured for the purpose of detecting a tape end. The free end of the blade 30 is located adjacent to a conductive pin 32 which is fixedly mounted on the left-hand portion of a support member 31 for the tape supply shaft 1.

Figure 4:
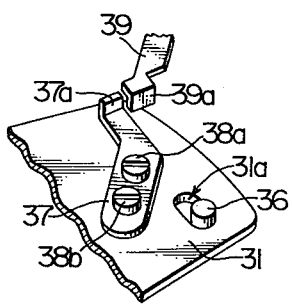
FIG. 4 is a perspective view of a detent member.

The support member 31 is pivotally mounted at 33 and rotatably supports the tape supply shaft 1 and its integrally associated drive wheel 1a in the central region thereof. In the left-hand upper portion, the support member 31 fixedly carries a pin 34, which is engaged by one end of a coiled spring 35, the other end of which is anchored to the stationary shaft 18, thus urging the support member 31 to rotate counterclockwise about pivot 33. In the upper right-hand portion, the support member 31 is formed with an arcuate slot 31a centered about the pivot 33 and engaged by a stationary pin 36, thus restricting the extent of rotation of the support member 31. A lug 37 having an upstanding edge 37a is secured to the support member 31 at a position adjacent to the slot 31a, by means of set screws 38a, 38b (see FIG. 4). A detent member 39 is formed as a downwardly depending extension from the lower edge of the right-hand arm of the switch operating member 17, and has a detent piece 39a on its free end which is slightly spaced from the upstanding edge 37a in the inoperative condition shown in FIG. 1.

The tape take-up shaft 7 is integrally provided with a drive gear 7a, which meshes with an intermediate gear 41 rotatably mounted on a shaft 40. The belt 12 extending around the pulley 13 is maintained in abutting relationship with the gear 41 under the bias to the actuating member 15 which is supplied by the spring 20.

Figure 2:
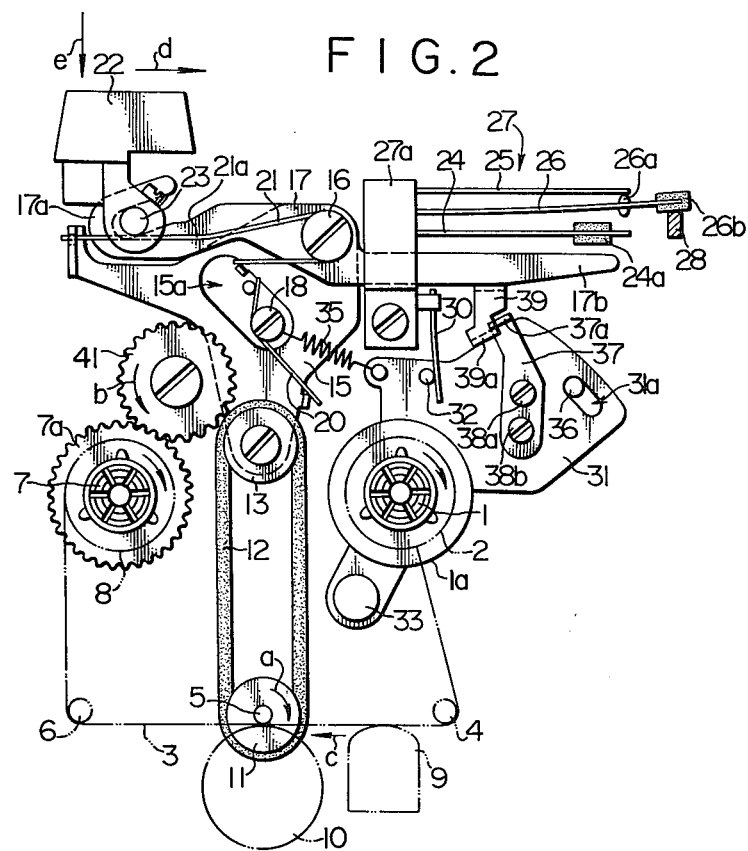
FIGS. 2 and 3 are similar plan views, but illustrating different operating conditions.

In operation, when a record/playback operation is to be established, the pusher 28 is moved in the upward direction from the inoperative condition shown in FIG. 1. This results in moving the insulating pad 26b and hence the common blade 26 upward until it comes into contact with the normal speed blade 25 as shown in FIG. 2, whereupon the drive source, not shown, is energized, driving the capstan 5 and pulley 11 at a given speed in the direction indicated by an arrow. Since the belt portion around the pulley 13 bears against the gear 41, the rotation of the pulley 11 is transmitted through the belt 12 and gear 41 to the drive gear 7a on the tape take-up shaft 7, whereby it rotates in the direction of an arrow to drive the tape hub 8. The rotation of the tape hub 8 in the direction to the arrow acts to pull and take up the tape 3 from the hub 2 along a path including the guide pin 4, capstan 5, and guide pin 6. At this time, the pinch roller 10 is brought into abutting relationship with the capstan 5 to feed the tape 3 at a uniform rate, allowing an intended record or playback operation on the tape.

When the tape operation and tape winding proceed to a point where no available length of tape 3 remains on the tape hub 2, the tension in the tape increases as the tape reaches its terminal end. The increased tape tension acts to pull the tape hub 2, tape supply shaft 1 and support member 31 in a direction toward the guide pin 4, thus causing an angular displacement of the support member 31 clockwise about the pivot 33. As the support member 31 moved angularly clockwise, the conductive pin 32 thereon moves into contact with the blade 30 to close a warning circuit, not shown, which operates to generate a tape end warning signal. The spacing between the detent piece 39a of the detent member 39 on the switch operating member 17 and the upstanding edge 37a of the lug 37 on the support member 31 is chosen so as to permit an angular movement of the latter as it detects the tape end.

When the cue, review and rewind actuating button 22 is moved to the right or in the direction of an arrow d (see FIG. 2) during a playback operation while there is an available length of tape 3 on the tape hub 2, only the switch operating member 17 slightly rotates counterclockwise about the shaft 16, with the switch operating piece 17b becoming engaged with and moving upward the insulating pad 24a on the increased speed blade 24 until all of the blades 24 to 26 are in contact with each other. Thereupon, the drive source is energized at an increased rate, causing a cueing operation or a rapid advance of the tape 3 while maintaining the magnetic head 9 in contact therewith. If such an operation is performed when the main switch of the tape recorder is closed but in a mode other than the record/playback mode, there results a normal rapid advance of the tape 3.

Figure 3:
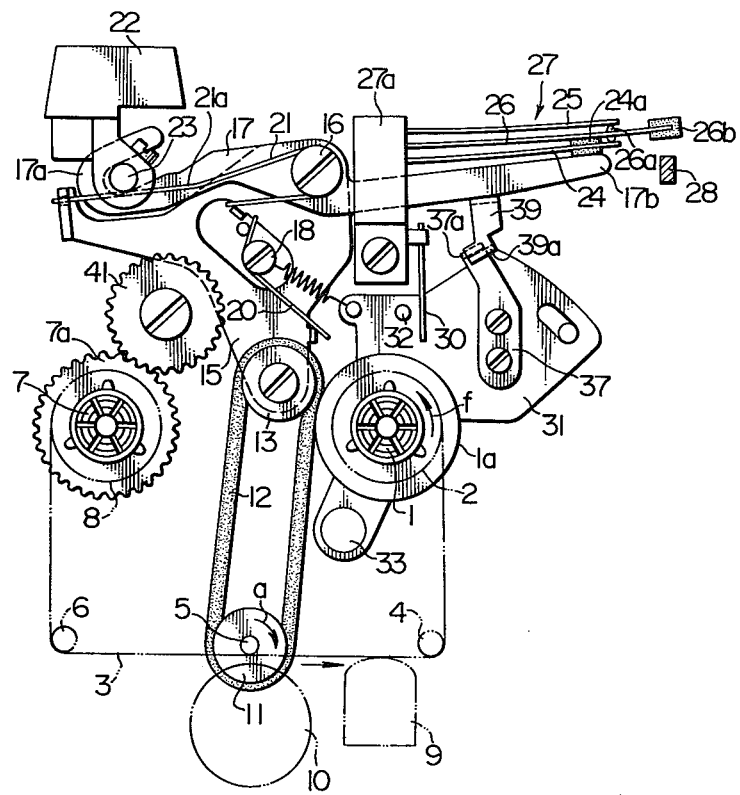

When the cue, review and rewind button 22 is depressed in the direction of an arrow e (see FIG. 2) during a playback operation, both the actuating member 15 and the switch operating member 17 slightly rotate about the shaft 16, as shown in FIG. 3, whereby the actuating member 15 brings both the pulley 13 and the belt 12 into abutting relationship with the drive wheel 1a on the tape supply shaft 1 while the switch operating member 17 brings all the blades 24 to 26 of the changeover switch into contact with each other. When the member 17 assumes such a position, the detent member 39 which is integral therewith will have its detent piece 39a located into the path of movement of the upstanding edge 37a of the lug 37, thereby engaging the detent piece 37a with the edge 39a. As a consequence, if the pulley 13 and the belt 12 are forced against the drive wheel 1a to tend to urge the support member 31 to rotate clockwise about the pivot 33, the support member 31 undergoes no displacement, preventing the movement of the conductive pin 32 into contact with the switch blade 30 and the resulting generation of a tape end warning signal.

When all of the switch blades 24 to 26 contact each other, the drive source rotates at a higher rate and its rotation is transmitted through the pulley 11, belt 12 and drive wheel 1a to the tape supply shaft 1, which therefore rotates in the direction of an arrow f or in the rewind direction. At this time, the magnetic head 9 is maintained in abutment against the tape 3, but the pinch roller 10 is removed from the capstan 5, so that the tape 3 is wound on the tape hub 2 while maintaining abutment against the head 9. This represents a review operation. When the above operation is performed during a mode other than record or playback mode while the main switch is closed, there takes a high speed rewind.

It will be noted that the detent member may be directly mounted on the actuating member 15 rather than the switch operating member 17.

What is claimed is:

1. In a tape recorder having a review/rewind manual control member and a displaceably mounted support member with a tape supply carrier comprising a driven wheel and being mounted for rotation on said support member and displaceable therewith an having means whereby increased tension of tape on said driven wheel carried thereby effects displacement of said support member at the end of tape undwinding and wherein said tape recorder has warning signal switch means disposed to be actuated responsive to said displacement of said support member for effecting energization of a warning signal when tape tension increases and including drive means movable against said driven wheel to effect driving engagement for review-rewind rotation responsive to operation of said manual control member;

the improvement which comprises detent means for preventing a false warning signal due to unwanted displacement of said support member caused by said driving engagement when said manual control member is operated;

said detent means comprising a detent element actuatable by operation of said manual control member to move to a predetermined position relative to said support member;

and a coacting detent element carried by said support member engageable with said first mentioned detent element thereby preventing displacement of said support member to preclude actuation of said signal switch means during review/rewind operation of said tape recorder.

2. In a tape recorder as set forth in claim 1, means comprising an actuating member intermediate said manual control member and said drive means and operable by actuation of said manual control member to move said drive means against said driven wheel;

said first mentioned detent element being carried on said actuating member.

* * * * *